United States Patent  
Hou et al.

(10) Patent No.: US 8,432,994 B2  
(45) Date of Patent: Apr. 30, 2013

(54) METHOD FOR DETERMINING DEMODULATION REFERENCE SIGNAL IN THE UPLINK, UE AND UPLINK SYSTEM

(75) Inventors: Xiaolin Hou, Beijing (CN); Zhan Zhang, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 392 days.

(21) Appl. No.: 12/835,654

(22) Filed: Jul. 13, 2010

(65) Prior Publication Data

US 2011/0002412 A1 Jan. 6, 2011

(51) Int. Cl.  
*H04B 7/02* (2006.01)

(52) U.S. Cl.  
USPC ........................................................ 375/267

(58) Field of Classification Search .................. 375/269, 375/259; 370/329  
See application file for complete search history.

(56) References Cited

U.S. PATENT DOCUMENTS

| | | | | |
|---|---|---|---|---|
| 2006/0068698 A1* | 3/2006 | Sandhu et al. | | 455/1 |
| 2010/0034312 A1* | 2/2010 | Muharemovic et al. | | 375/267 |
| 2010/0074343 A1* | 3/2010 | Gaal et al. | | 375/259 |
| 2010/0157918 A1* | 6/2010 | Kim et al. | | 370/329 |
| 2010/0296459 A1* | 11/2010 | Miki et al. | | 370/329 |
| 2011/0051824 A1* | 3/2011 | Kim et al. | | 375/259 |
| 2011/0134849 A1* | 6/2011 | Lee et al. | | 370/328 |
| 2011/0141982 A1* | 6/2011 | Zhang et al. | | 370/329 |
| 2011/0200135 A1* | 8/2011 | Sorrentino et al. | | 375/295 |
| 2011/0206030 A1* | 8/2011 | Hoshino et al. | | 370/342 |

* cited by examiner

*Primary Examiner* — Jaison Joseph  
(74) *Attorney, Agent, or Firm* — Blakely, Sokoloff, Taylor & Zafman LLP

(57) ABSTRACT

The present invention discloses a method for determining an uplink demodulation reference signal (DMRS), which includes: taking one of multiple transmit antennas in the uplink as a base transmit antenna, taking other transmit antennas as subordinating transmit antennas and setting a DMRS for the base transmit antenna; establishing DMRS subordinating relationships between the base transmit antenna and each of the subordinating transmit antennas; and setting a DMRS for each of the subordinating transmit antennas according to the DMRS of the base transmit antenna and the DMRS subordinating relationship between the base transmit antenna and each of the subordinating transmit antennas. The present invention also provides a user equipment (UE) and an uplink system for providing DMRSs for multiple transmit antennas. The method, UE and system are applicable in both SU-MIMO transmission and MU-MIMO transmission.

14 Claims, 8 Drawing Sheets

METHOD FOR DETERMINING DEMODULATION REFERENCE SIGNAL IN THE UPLINK, UE AND UPLINK SYSTEM

FIELD OF THE INVENTION

The present invention relates to wireless communications technologies, and especially to a method for determining demodulation reference signals in the uplink, a user equipment (UE) and an uplink system of the wireless communications system.

BACKGROUND OF THE INVENTION

3GPP Long Term Evolution (LTE) project is an evolution and innovation for current 3G technologies, which can substantially increase spectral efficiency and cell capacity, and also can flexibly support multiple kinds of bandwidth configuration. The uplink of the LTE system adopts a single carrier frequency division multiple access (SC-FDMA) technology, which has low Peak-to-Average Power Ratio (PAPR) and can support a wide range of coverage effectively. Taking into consideration the constraint of the cost and the standardization progress of a UE, the existing uplink of the LTE system adopts a single-antenna rather than a multi-antenna technology to transmit signals of a UE. It should be noted that, the UE mentioned in the application can be a terminal equipment used by a user, such as a mobile phone.

The uplink of LTE has two kinds of reference signals: demodulation reference signal (DMRS) and sounding reference signal (SRS). The DMRS is mainly used for channel estimation for Physical Uplink Shared Channel (PUSCH), while the SRS is mainly used to detect quality of uplink channels. A Constant Modulus Zero Autocorrelation (CAZAC) code is adopted as a base sequence of the DMRS of the PUSCH in LTE, and more reference signals are obtained through different cyclic shift (CS) of the base sequence. The reference signal $r_{u,v}^{(\alpha)}(n)$ is generated by formula (1), wherein subscript u is the serial number of a group which the reference signal is separated into, and v is the serial number of the reference signal within the group.

$$r_{u,v}^{(\alpha)}(n) = e^{j\alpha n} \bar{r}_{u,v}(n), \quad 0 \leq n < M_{sc}^{RS} \quad (1)$$

In formula (1), $\bar{r}_{u,v}(n)$ refers to the base sequence, $M_{sc}^{RS}$ refers to the length of the base sequence, and $\alpha$ refers to a cyclic shift value of the base sequence and is determined in accordance with formula (2).

$$\alpha = 2\pi n_{cs}/12 \quad (2)$$

$$n_{cs} = (n_{DMRS}^{(1)} + n_{DMRS}^{(2)} + n_{PRS}) \bmod 12 \quad (3)$$

In formula (3), $n_{DMRS}^{(1)}$, $n_{DMRS}^{(2)}$ and $n_{PRS}$ are three components for determining the cyclic shift value. Among them, $n_{DMRS}^{(1)}$ is broadcasted in the cell; $n_{DMRS}^{(2)}$ is designated by an uplink scheduling command; $n_{PRS}$ is generated based on a pseudo-random sequence, which is common in the same cell. In other words, with respect to the cyclic shift value, $n_{DMRS}^{(1)}$ is a cell broadcasting component, $n_{DMRS}^{(2)}$ is an uplink scheduling component, and $n_{PRS}$ is a pseudo-random sequence component.

In order to reduce inter-cell interferences (ICI) between DMRSs of different cells, the cyclic shift value of the DMRS of each UE should hop at each slot in accordance with a predetermined pattern, similar to frequency hopping. In other words, the cyclic shift value of the base sequence is time-varying. Thus, a transmit antenna uses different reference signals as demodulation reference signals at different slots.

As the standard-setting work of LTE Rel-8 draws to a close, the research of LTE-A is started by 3GPP in the middle of 2008. LTE-A is a follow-up evolution of LTE, whose performance requirements are described in 3GPP TR 36.913. In comparison with LTE, a higher requirement is put on the system performance (in particular the performance of uplink) of LTE-A. For example, an LTE-A system requires that the peak spectrum efficiency of the uplink should reach 15 bps/Hz, which can not be satisfied by using only a single transmit antenna in the uplink of LTE. In order to meet the higher requirement on the uplink, it is considered to be necessary to use multi-antenna transmission technique in the uplink of LTE-A to further increase the spectrum efficiency.

Of course, a multi-antenna transmission system is much more complicated than a signal-antenna transmission system. There are many new issues to be considered, for example, how to provide demodulation reference signals for the uplink with multiple transmit antennas is an issue to be addressed.

SUMMARY OF THE INVENTION

A main object of the present invention is to provide a method for determining uplink demodulation reference signals, a UE and an uplink system enabling the uplink based on multiple transmit antennas to have a better performance.

A method is provided for determining demodulation reference signal (DMRS) in the uplink, which includes:

taking one of multiple transmit antennas in the uplink as a base transmit antenna, taking other transmit antennas as subordinating transmit antennas and setting a DMRS for the base transmit antenna;

establishing DMRS subordinating relationships between the base transmit antenna and each of the subordinating transmit antennas, and setting a DMRS for each of the subordinating transmit antennas according to the DMRS of the base transmit antenna and the corresponding DMRS subordinating relationship.

Optionally, the method of setting a DMRS for the base transmit antenna includes:

selecting a base sequence for the DMRS of the base transmit antenna;

obtaining a reference signal of the base transmit antenna by performing a cyclic shift to the base sequence; and taking the reference signal as the DMRS of the base transmit antenna.

Optionally, the method of setting a DMRS for the base transmit antenna includes:

calculating the reference signal of the base transmit antenna in accordance with formula $r_{u,v}^{(\alpha)}(n) = e^{j\alpha n} \bar{r}_{u,v}(n)$, $0 \leq n < M_{sc}^{RS}$;

wherein $\bar{r}_{u,v}(n)$ refers to the base sequence, $\alpha$ refers to a cyclic shift value of the base sequence, and $M_{sc}^{RS}$ refers to the length of the base sequence.

Optionally, the method of establishing DMRS subordinating relationships between the base transmit antenna and each of the subordinating transmit antennas includes:

maximizing the difference between the cyclic shift value of the DMRS of the base transmit antenna and that of each of the subordinating transmit antennas.

Optionally, the method of establishing DMRS subordinating relationships between the base transmit antenna and each of the subordinating transmit antennas includes:

determining a cyclic shift value for the DMRS of the $i_{th}$ subordinating transmit antenna in accordance with formula $\alpha_i = 2\pi n_{cs,i}/C$ and formula $$n_{cs,i} = \left(n_{cs,0} + \frac{C}{n_T} \cdot i\right) \bmod(C);$$

wherein $i=1, \ldots, n_T-1$, C is a constant, $n_T$ is the number of the transmit antennas, $\alpha_0$ is the cyclic shift value of the DMRS of the base transmit antenna.

Optionally, the method of setting a DMRS for each of the subordinating transmit antennas according to the DMRS of the base transmit antenna and the corresponding DMRS subordinating relationship includes:

calculating a reference signal for each of the subordinating transmit antennas according to the determined cyclic shift value of the DMRS of each of the subordinating transmit antennas and the base sequence of the DMRS of the base transmit antenna.

Optionally, the method of establishing DMRS subordinating relationships between the base transmit antenna and each of the subordinating transmit antennas includes:

determining an uplink scheduling component of the cyclic shift value of the DMRS of the $i_{th}$ subordinating transmit antenna in accordance with formula $$n_{DMRS,i}^{(2)} = \left(n_{DMRS,0}^{(2)} + \frac{C}{n_T} \cdot i\right) \bmod(C);$$

wherein $i=1, \ldots, n_T-1$, C is a constant, $n_T$ is the number of the transmit antennas.

Optionally, the method of setting a DMRS for each of the subordinating transmit antennas according to the DMRS of the base transmit antenna and the corresponding DMRS subordinating relationship includes:

sending, by a base station, an uplink scheduling command to each user equipment (UE) corresponding to each of the subordinating transmit antennas, the uplink scheduling command including the uplink scheduling component of the cyclic shift value of the DMRS;

each UE calculating the cyclic shift value of its DMRS according to the uplink scheduling component after receiving the uplink scheduling command, and calculating the reference signal of the corresponding subordinating transmit antenna according to the base sequence of the base transmit antenna and the calculated cyclic shift value.

Optionally, the method further includes:

the base station receiving the DMRSs sent by the multiple transmit antennas, performing Fast Fourier Transform (FFT) to the received DMRSs and converting them from the time domain to the frequency domain, and multiplying the frequency-domain DMRSs by the complex conjugation of the DMRS of the base transmit antenna previously stored in the base station;

the base station performing Inverse Fast Fourier Transform (IFFT) to the DMRSs multiplied by the complex conjugation and converting them from the frequency domain to the time domain, and setting multiple channel impulse response regions for the DMRSs in the time domain;

the base station distinguishing multiple channel impulse responses corresponding to different transmit antennas within the channel impulse response regions according to the cyclic shift value of the DMRS of each of the transmit antennas, extracting the distinguished channel impulse responses respectively, and performing Fast Fourier Transform to the extracted channel impulse response corresponding to each transmit antenna and converting it from the time domain to the frequency domain.

Optionally, the method further includes:

performing a frequency-domain windowing operation before performing the Inverse Fast Fourier Transform;

performing a frequency-domain dewindowing operation after performing the Fast Fourier Transform to the extracted channel impulse response corresponding to each transmit antenna.

Optionally, the method of setting a channel impulse response region for the DMRSs in the time domain includes: taking $$\left(\frac{C}{n_T} \cdot i\right) \cdot N_{FFT}, i = 0, 1, \ldots, n_T - 1$$

as a central point, and selecting $\mu \cdot \Delta$ samples on the left of the central point from the channel impulse response;

wherein $\Delta$ is the main lobe width of the energy leakage of the channel impulse response and $$\Delta = \frac{N_{FFT}}{12 \cdot RB\#}, N_{FFT}$$

is the number of samples of the Fast Fourier Transform, RB# is the number of recourse blocks, the value range of $\mu$ is $$0 \leq \mu < \frac{N_{FFT}/n_T - CP}{\Delta},$$

and CP is the length of the cyclic prefix of an SC-FDMA symbol, C is a constant, $n_T$ is the number of the transmit antennas.

Optionally, the method of setting a channel impulse response region of the DMRSs in the time domain includes: taking $$\left(\frac{C}{n_T} \cdot i\right) \cdot N_{FFT}, i = 0, 1, \ldots, n_T - 1$$

as a central point, and selecting $\lambda \cdot CP$ samples on the right of the central point from the channel impulse response, wherein CP is the length of the cyclic prefix of an SC-FDMA symbol, and the value range of $\lambda$ is $0 < \lambda \leq 1$, C is a constant, $n_T$ is the number of the transmit antennas.

A user equipment (UE) is provided, wherein the UE has multiple transmit antennas and a multiplier is set for each transmit antenna;

the UE further includes: a base sequence selection module and a demodulation reference signal (DMRS) subordination module;

the base sequence selection module is adapted to determine a base sequence for DMRSs of the multiple transmit antennas;

the DMRS subordination module is adapted to take one of the multiple transmit antennas as a base transmit antenna and take other transmit antennas as subordinating transmit antennas, establish subordinating relationships between a cyclic shift value of the DMRS of the base transmit antenna and that of each of the subordinating transmit antennas; and determine the cyclic shift value of the DMRS of each subordinating transmit antenna according to the cyclic shift value of the DMRS of the base transmit antenna;

the multiplier set for each transmit antenna is adapted to multiply the cyclic shift value of the corresponding transmit antenna and the base sequence to obtain the DMRS of the corresponding transmit antenna.

Optionally, the DMRS subordination module is adapted to calculate the cyclic shift value of the DMRS of the $i_{th}$ subordinating transmit antenna according to formula $\alpha_i = 2\pi n_{cs,i}/C$ and formula $$n_{cs,i} = \left(n_{cs,0} + \frac{C}{n_T} \cdot i\right) \mod(C),$$

wherein $i=1, \ldots, n_T-1$, C is a constant, $n_T$ denotes the number of the transmit antennas, $\alpha_0$ denotes the cyclic shift value of the DMRS of the base transmit antenna.

An uplink communication system is provided, which includes: a base station and multiple user equipments (UE), each of the UEs having one transmit antenna;

the base station is adapted to take one of the multiple transmit antennas of the multiple UEs as a base transmit antenna, take other transmit antennas as subordinating transmit antennas, establish demodulation reference signal (DMRS) subordinating relationships between the DMRS of the base transmit antenna and that of each of the subordinating transmit antennas, and inform each UE of corresponding uplink scheduling component of the cyclic shift value of the DMRS through an uplink scheduling command;

each UE is adapted to calculate the DMRS according to the uplink scheduling component of the cyclic shift value informed by the base station and a base sequence of the DMRS of the base transmit antenna.

Optionally, the base station is adapted to determine the uplink scheduling component of the cyclic shift value of the DMRS of the transmit antenna according to formula $$n_{DMRS,i}^{(2)} = \left(n_{DMRS,0}^{(2)} + \frac{C}{n_T} \cdot i\right) \mod(C),$$

and notify the corresponding UE of the uplink scheduling component of the cyclic shift value of the DMRS of each transmit antenna through the uplink scheduling command;

wherein $i=0, 1, \ldots, n_T-1$, C is a constant, $n_T$ denotes the number of the transmit antennas, $n_{DMRS,0}^{(2)}$ denotes the uplink scheduling component of the cyclic shift value of the DMRS of the base transmit antenna.

It can be seen from the above technical schemes that, the method for determining uplink demodulation reference signals, the UE and the uplink system of the present invention design DMRSs of multiple transmit antennas based on subordinating relationships between DMRSs. The DMRS subordinating relationship could be maximum distance binding (MDB) of cyclic shift values. The method, equipment and system are applicable in both SU-MIMO transmission and MU-MIMO transmission.

Further, the present invention also makes improvements on channel estimation of uplink receivers, in which dynamic CIR reservation DCIR$^2$) is adopted to improve the performance of channel estimation. And since link performance relies on the quality of channel estimation, this channel estimation method can further improve the link performance.

DETAILED DESCRIPTION OF THE INVENTION

To make the purpose and technical solution of the present invention more clearly, the present invention is described hereinafter with reference to the following drawings and embodiments.

Figure 1:
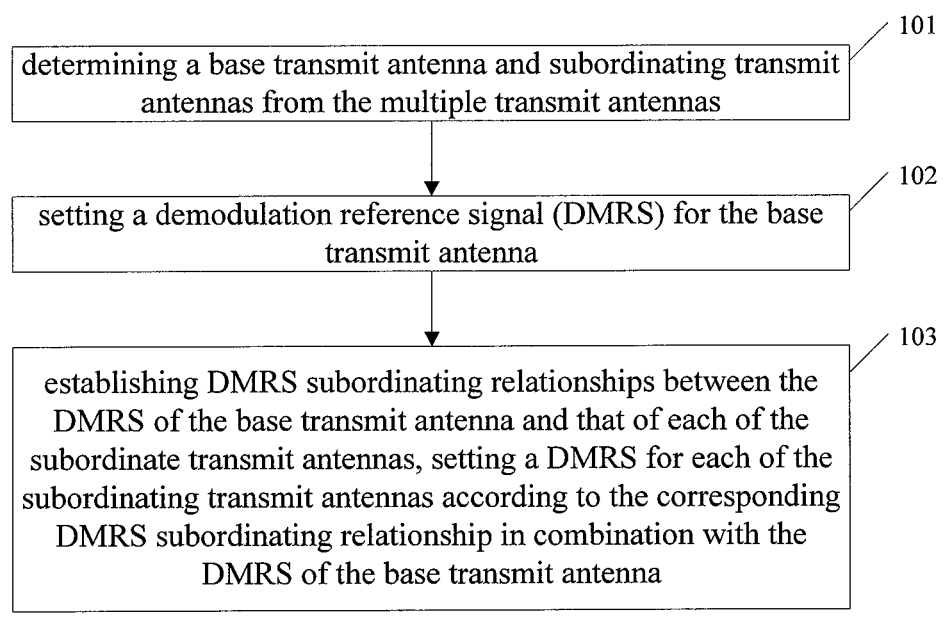
FIG. 1 is a flowchart illustrating a method for providing demodulation reference signals for an uplink system in accordance with an embodiment of the present invention.

In accordance with an embodiment of the present invention, the uplink system has multiple transmit antennas. It is assumed that the number of the transmit antennas $n_T \geq 2$, that is, the uplink system includes transmit antennas $0, 1, \ldots, n_T-1$. As shown in FIG. 1, a method for providing demodulation reference signals in the uplink system includes the following steps:

Step 101: determining a base transmit antenna and subordinating transmit antennas from the multiple transmit antennas.

In detail, one transmit antenna is selected as the base transmit antenna from the $n_T$ transmit antennas, and other $n_T-1$ transmit antennas are all subordinating transmit antennas. For example, transmit antenna 0 can be selected as the base transmit antenna, and thus transmit antennas $1, \ldots, n_T-1$ are all subordinating transmit antennas.

Step 102: setting a demodulation reference signal (DMRS) for the base transmit antenna.

In detail, the DMRS set for the base transmit antenna can be a DMRS defined in LTE protocol (such as 3GPP TS 36.211). The hopping pattern of the cyclic shift value of the DMRS of the base transmit antenna can follow the specification of existing protocols.

Step 103: establishing DMRS subordinating relationships between the DMRS of the base transmit antenna and that of each of the subordinate transmit antennas, setting a DMRS for each of the subordinating transmit antennas according to the corresponding DMRS subordinating relationship in combination with the DMRS of the base transmit antenna.

Here, the corresponding DMRS subordinating relationship of the DMRS can be embodied in maximum distance binding (MDB) of the cyclic shift value of the DMRS, or a scheduling subordination of the value of $n_{DMRS}^{(2)}$, or other subordinating manner.

In accordance with the setting manner of the transmit antennas, the infrastructure of the uplink system can be divided into two types: first, single-user multiple-input multiple-output (SU-MIMO), that is, a portion of time-frequency resources of the system is allowed to be used by only one UE, and the UE has multiple transmit antennas; second, multiple-user multiple-input multiple-output (MU-MIMO), that is, a portion of time-frequency resources of the system is allowed to be used by multiple UEs simultaneously, and each UE has one transmit antenna. As it can be seen, SU-MIMO and MU-MIMO have something in common, that is, the same portion of time-frequency resources is shared among multiple transmit antennas.

Figure 2:
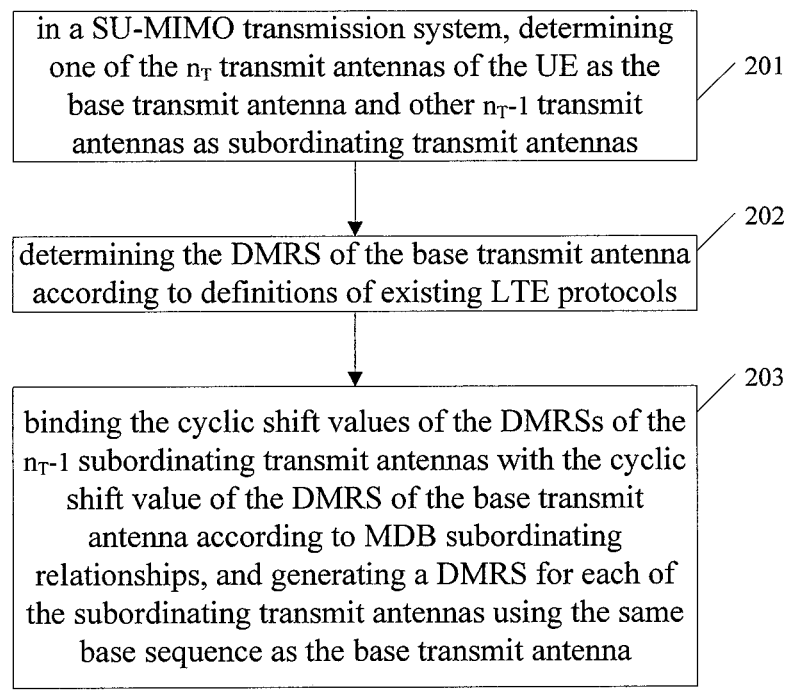
FIG. 2 is a flowchart illustrating a method for providing uplink demodulation reference signals in an SU-MIMO system in accordance with the present invention.

The process of determining uplink DMRSs in a SU-MIMO transmission system is illustrated in FIG. 2, which includes:

Step 201: determining one of the $n_T$ transmit antennas of the UE as the base transmit antenna and other $n_T-1$ transmit antennas as subordinating transmit antennas.

Step 202: determining the DMRS of the base transmit antenna according to definitions of existing LTE protocols.

For example, the DMRS of the base transmit antenna can be obtained in accordance with formula (1). It should be noted that, the base transmit antenna uses the same DMRS as a single transmit antenna, thus the uplink system with multiple transmit antennas maintains backward compatibility with the existing LTE protocols.

Step 203: binding the cyclic shift values of the DMRSs of the $n_T-1$ subordinating transmit antennas (that is, transmit antennas $1, \ldots, n_T-1$ with the cyclic shift value of the DMRS of the base transmit antenna, and generating a DMRS for each of the subordinating transmit antennas using the same base sequence as the base transmit antenna.

Specifically, the selection of the cyclic shift value of each subordinating transmit antenna should meet a given subordinating relationship. For example, the given subordinating relationship can be determined according to the maximum distance binding (MDB) provided by formulas (4) and (5). Here, formulas (4) and (5) are named as MDB subordinating conditions.

$$\alpha_i = 2\pi n_{cs,i}/C \qquad (4)$$

$$n_{cs,i} = \left(n_{cs,0} + \frac{C}{n_T} \cdot i\right) \bmod(C), i = 0, 1, \ldots, n_T - 1 \qquad (5)$$

In formula (4), $\alpha_0$ represents the cyclic shift value of the DMRS of the base transmit antenna, whose value hops with time. The hopping manner is the same as that of the DMRS of a single transmit antenna defined in the existing LTE protocols, which will not be explained in detail. C is a constant. As to the PUSCH in the existing LTE protocols, C=12.

It can be seen that formula (4) adopts a frequency-domain phase rotation approach to design the DMRSs of different transmit antennas, that is, to assign different cyclic shift values to the DMRSs of different transmit antennas. In principle, as long as different transmit antennas select different cyclic shift values of the DMRSs at the same time, a same channel estimation and link performance can be obtained. In other words, because the energy leakage in the channel estimation method is not considered in principle, the effects of different cyclic shift values are the same. However, in an actual system the energy leakage in a channel estimation process must be taken into consideration, thus the larger the difference between the cyclic shift values, the smaller the interference between DMRSs of transmit antennas. That is, in the actual system, selecting different cyclic shift values result in different performances, and may further result in a great decrease in channel estimation and link performance.

Therefore, in formula (4), the cyclic shift values of DMRSs of multiple transmit antennas are kept in maximum distance binding. The cyclic shift value of any of the subordinating transmit antennas can be obtained in case that the cyclic shift value of the base transmit antenna is known. When the cyclic shift value of the DMRS of the base transmit antenna hops in a certain pattern, the cyclic shift value of the DMRS of any subordinating transmit antenna will hop with it since there is a subordinating relationship between the cyclic shift values of the two antennas. That is, the cyclic shift values of the DMRSs of the subordinating transmit antennas are also time-varying. Therefore, though the number of the transmit antennas of the uplink system becomes large, no additional signaling overhead is needed to support the hopping of the cyclic shift values of the DMRSs of the multiple transmit antennas.

It can be seen that the "maximum distance" can minimize the interferences among the DMRSs of the multiple transmit antennas, and the "binding" can reduce the signaling overhead. Furthermore, since the DMRS of the base transmit antenna can be defined in accordance with the existing LTE protocols, when developing the existing single-antenna transmission system to a multiple antenna transmission system, no modification to the DMRS of the existing single transmit antenna is needed, which ensures the backward compatibility with LTE.

In an embodiment, expansions can be made to the method illustrated in FIG. 2. For example, in step 202, the DMRS of the base transmit antenna can be set at will, or a hopping pattern which is different from the hopping pattern defined in the existing LTE protocols is adopted as the hopping pattern of the cyclic shift value of the DMRS of the base transmit antenna. Then, the DMRSs of the entire uplink system are determined by ensuring the DMRS subordinating relationships between the DMRS of any of the subordinating transmit antennas and that of the base transmit antenna.

Figure 3:
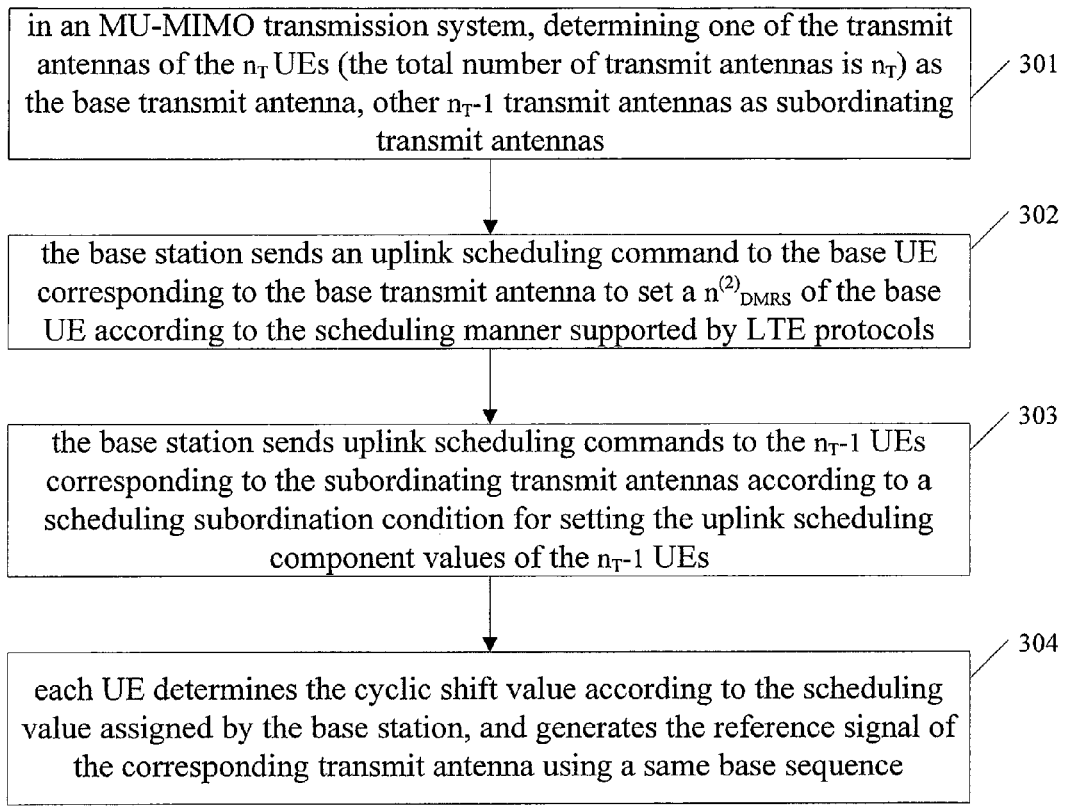
FIG. 3 is a flowchart illustrating a method for providing uplink demodulation reference signals in an MU-MIMO system in accordance with the present invention.

The process of determining uplink DMRSs in an MU-MIMO transmission system is illustrated in FIG. 3, which includes:

Step 301: determining one of the transmit antennas of the $n_T$ UEs (the total number of transmit antennas is $n_T$) as the base transmit antenna, other $n_T-1$ transmit antennas as subordinating transmit antennas.

To be brief, the UE corresponding to the base transmit antenna is called the base UE. Correspondingly, other UEs are called subordinating UEs.

Step 302: the base station calculates the uplink scheduling components of the cyclic shift values of the DMRSs of the multiple UEs, i.e., both the base UE and the subordinating UEs.

Step 303: the base station sends an uplink scheduling command to each UE corresponding to each transmit antenna to set an uplink scheduling component $n_{DMRS}^{(2)}$ of the cyclic shift value of the DMRS of the UE. Here, the base station sends an uplink scheduling command to each of the transmit antennas individually. Each uplink scheduling command carries the uplink scheduling component of the cyclic shift value of the DMRS of the corresponding transmit antenna.

In step 302, the base station calculates $n_{DMRS}^{(2)}$ values for multiple UEs participating in an MU-MIMO transmission according to formula (6).

$$n_{DMRS,i}^{(2)} = \left(n_{DMRS,0}^{(2)} + \frac{C}{n_T} \cdot i\right) \mod(C), i = 0, 1, \ldots, n_T - 1 \quad (6)$$

Here, $n_{DMRS,0}^{(2)}$ is the scheduling value of the base UE (i.e. the base transmit antenna) involved in the MU-MIMO transmission. The value of $n_{DMRS,0}^{(2)}$ can be consistent with that employed in the scheduling method of the existing LTE protocols. In the existing LTE protocols, the value of $n_{DMRS,0}^{(2)}$ is assigned by a cyclic shift domain in DCI format 0, wherein the cyclic shift domain is of 3-bit length. Thus, there are 8 cyclic shift values supported by the protocols: 0, 2, 3, 4, 6, 8, 9, 10. It should be noted that the DCI format 0 is a signaling sent by the base station which provides downlink control information.

Referring to the scheduling method supported by the existing LTE protocols, there are two schemes of $n_{DMRS}^{(2)}$ assignment which satisfy the scheduling subordination condition of formula (6).

Scheme 1: no modifications on the existing LTE protocols.

With respect to a MU-MIMO transmission with two users, the condition $n_{DMRS,i}^{(2)} = 0,6; 2,8; 3,9; 4,10$ (i=0,1) should be met. For example, when $n_{DMRS,0}^{(2)} = 0$, $n_{DMRS,1}^{(2)} = 6$ With respect to a MU-MIMO transmission with four users, the condition $n_{DMRS,i}^{(2)} = 0, 3, 6, 9$ (i=0, 1, 2, 3) should be met.

Scheme 2: expanding the length of the cyclic shift domain of the DCI format 0 to 4 bits.

In this way, the value of $n_{DMRS,i}^{(2)}$ can be from 0 to 11 (with a total number of 12 values) as long as the scheduling subordination condition of formula (6) is met.

It can be seen that, only the uplink scheduling component $n_{DMRS}^{(2)}$ of the cyclic shift value of the DMRS is adjusted in steps 302 and 303, and other two components $n_{DMRS}^{(1)}$ and $n_{PRS}$ have no influence on distinguishing multiple UEs in the MU-MIMO transmission. The cyclic shift value can be calculated according to formulas (2) and (3) after determining the uplink scheduling component $n_{DMRS}^{(2)}$ and obtaining the cell broadcasting component $n_{DMRS}^{(1)}$ and the pseudo-random sequence component $n_{PRS}$.

Step 304: each UE determines the cyclic shift value of its DMRS according to the scheduling value assigned by the base station, and generates the reference signal of the corresponding transmit antenna using a same base sequence.

Figure 4:
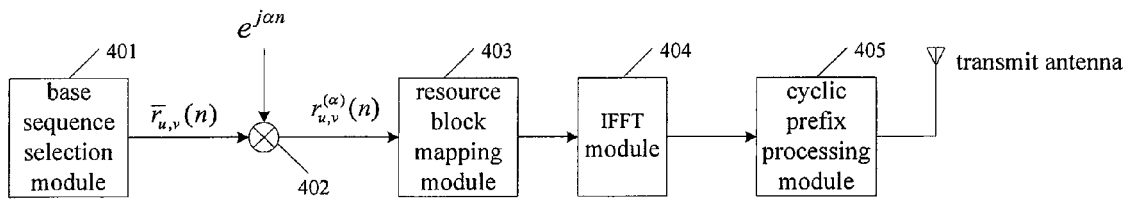
FIG. 4 is a schematic diagram illustrating the structure of a traditional demodulation reference signal device with a single transmit antenna.

In case that the uplink system only has a single transmit antenna, the DMRS device located in the UE, whose structure is illustrated in FIG. 4, includes: a base sequence selection module 401, a multiplier 402, a resource block mapping module 403, an IFFT module 404, a cyclic prefix processing module 405. Among them, the base sequence selection module 401 is adapted to determine a $\bar{r}_{u,v}(n)$ as the base sequence of DMRSs, and the multiplexer 402 is adapted to multiply $e^{j\alpha n}$ carrying the cyclic shift value and the base sequence $\bar{r}_{u,v}(n)$ to obtain a reference signal $r_{u,v}^{(\alpha)}(n)$. The reference signal $r_{u,v}^{(\alpha)}(n)$ is then processed by the resource block mapping module 403, the IFFT module 404, the cyclic prefix processing module 405, and the signal obtained after the above mentioned processing is transmitted by the transmit antenna. Specifically, the resource block mapping module 403 is adapted to put the reference signal in a proper time-frequency resource position, and the cyclic prefix processing module 405 is adapted to add a cyclic prefix to the signal which has undergone an IFFT processing.

Figure 5:
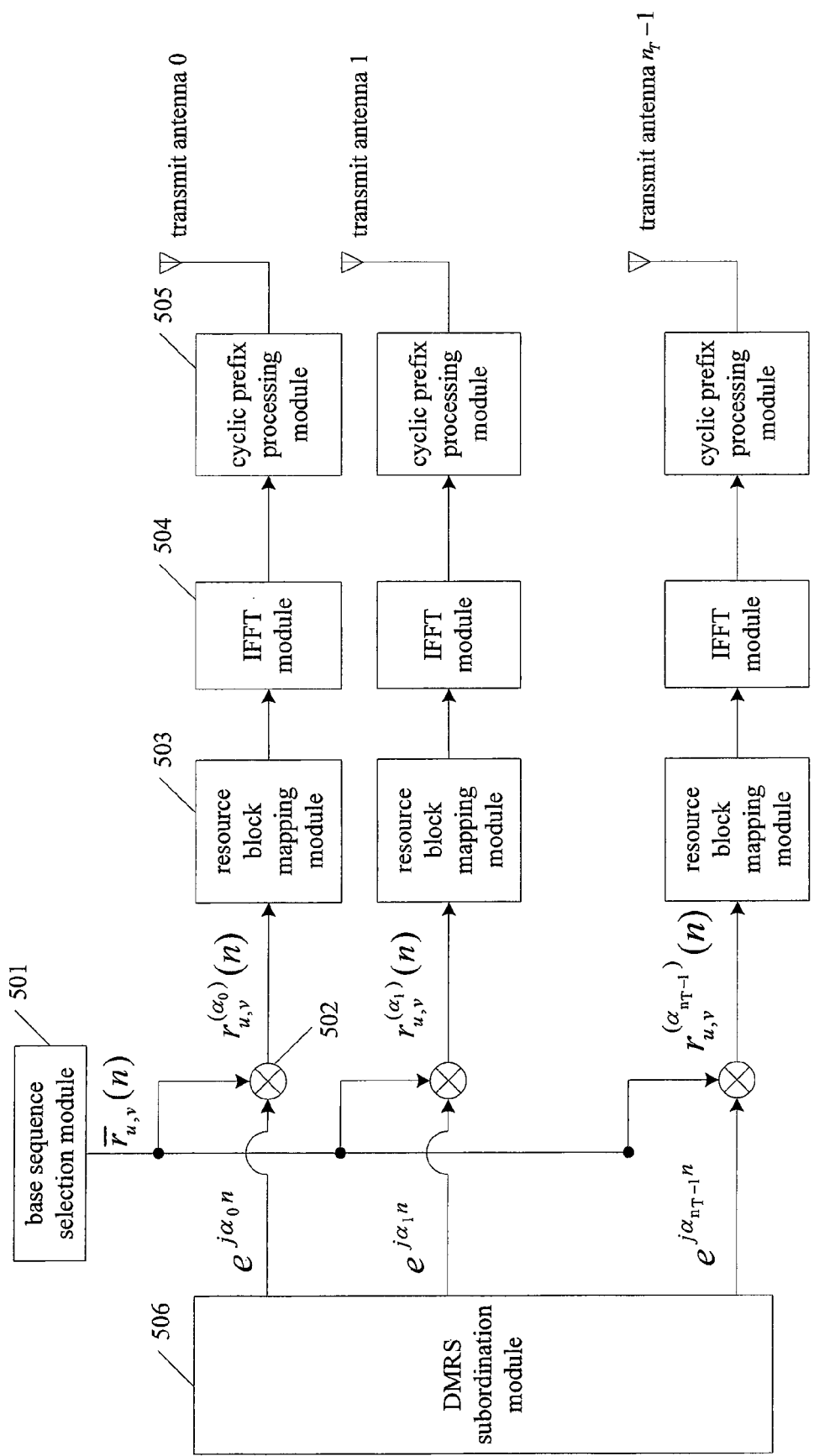
FIG. 5 is a schematic diagram illustrating the structure of a demodulation reference signal device located in a UE with multiple transmit antennas in accordance with an embodiment of the present invention.

In accordance with an embodiment of the present invention, an SU-MIMO system has multiple transmit antennas. Since it is needed to provide DMRSs for the multiple transmit antennas, modifications should be made on the structure of the DMRS device located in the UE compared with its conventional structure. FIG. 5 illustrates the structure of the modified DMRS device, which includes: a base sequence selection module 501, a DMRS subordination module 506, multiple multipliers 502, multiple resource block mapping modules 503, multiple IFFT modules 504, and multiple cyclic prefix processing modules 505. Here, referring to FIG. 5, each transmit antenna is installed with a set of processing modules including a multiplier 502, a resource block mapping module 503, an IFFT module 504 and a cyclic prefix processing module 505. Among them, the functions of the base sequence selection module 501, the multiplier 502, the resource block mapping module 503, the IFFT module 504 and the cyclic prefix processing module 505 are similar to the functions of corresponding modules illustrated in FIG. 4.

Further, the DMRS subordination module 506 is adapted to guarantee certain subordinating relationships between cyclic shift values when providing the cyclic shift values of the DMRSs for the transmit antennas $0, 1, \ldots, n_T-1$, wherein the subordinating relationship may be such as a MDB subordinating relationship provided in formulas (4) and (5).

In addition, the present invention also provides an uplink system for MU-MIMO transmission, including: multiple UEs and a base station covering these UEs, wherein each UE has one transmit antenna.

A scheduling subordination module is set in the base station, adapted to assign the values of $n_{DMRS}^{(2)}$ for the multiple UEs according to formula (6). After receiving the corresponding value of $n_{DMRS}^{(2)}$, each UE determines the cyclic shift value of its own DMRS, and generates the DMRS for its transmit antenna using a same base sequence.

In the previously presented schemes, each antenna is provided with a demodulation reference signal (DMRS), while subordinating relationships are required between the DMRSs. That is, a DMRS is given for a data stream transmitted from one antenna, and the total number of DMRSs equals to that of antennas. However, there is some flexibility in the schemes, allowing each data stream to be sent out by one or more antennas being precoded before sending and each non-precoded data stream being provided with a DMRS. Specifically, each data stream (i.e., non-precoded data stream) together with the DMRS provided to it is precoded to form one or more precoded data streams, and each precoded data stream is transmitted via an antenna. In this way, the total number of DMRSs equals to the number of non-precoded data streams and may be less than the number of antennas. For example, in the MU-MIMO transmission system, a UE may be equipped with two or more antennas, but only one non-precoded data stream is to be sent out by these antennas and the non-precoded data stream together with the DMRS provided to it is precoded into two or more precoded data streams. Subordinating relationships between the DMRSs corresponding to different non-precoded data streams can follow the above mentioned formulas, such as formulas (4)-(6), wherein the subscript $i=0, 1, \ldots, n_T-1$ represents the $i_{th}$ non-precoded data stream and the number of non-precoded data streams is $n_T$.

Figure 6:
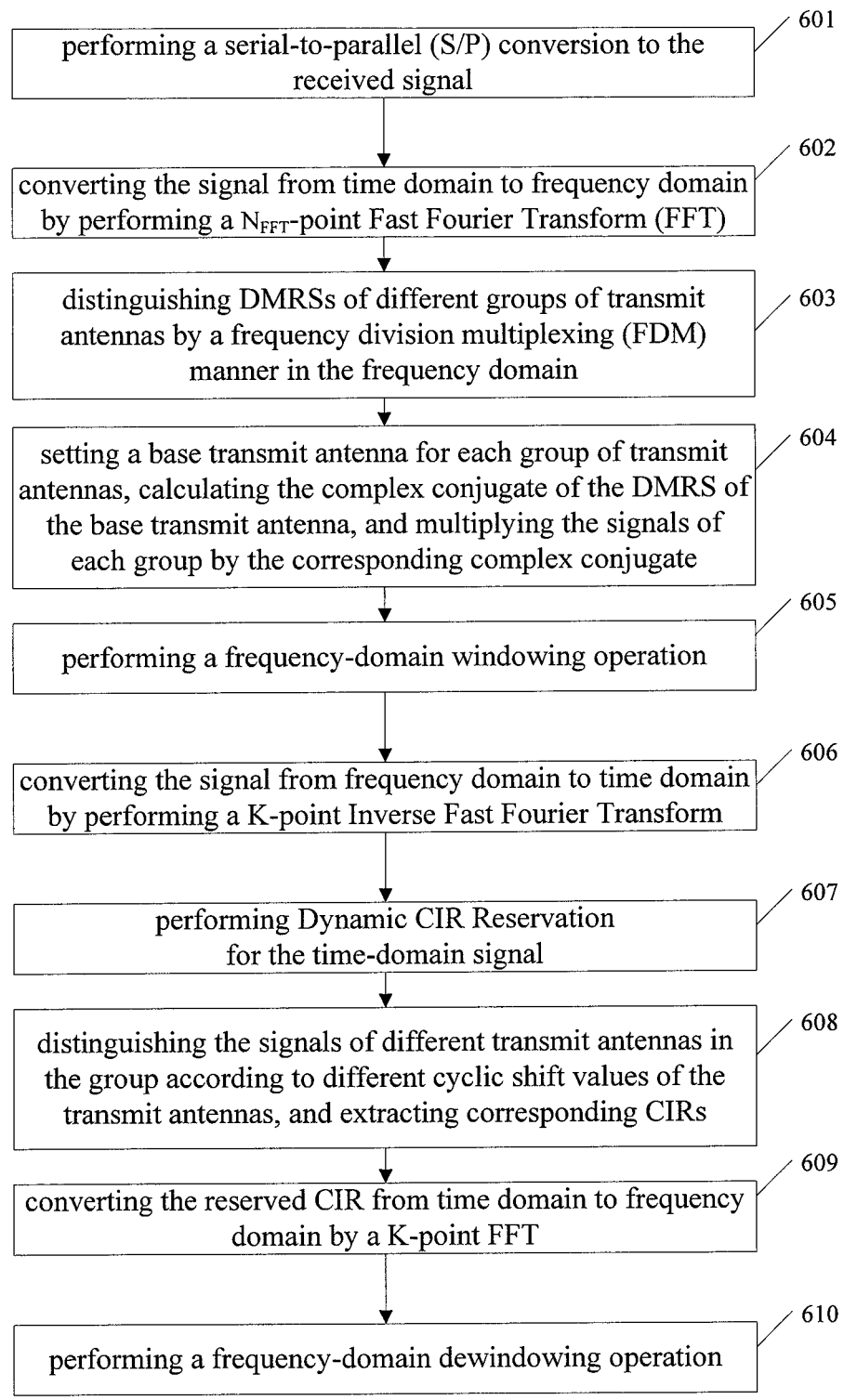
FIG. 6 is a flowchart illustrating a channel estimation method in accordance with an embodiment of the present invention.

Furthermore, besides the method for providing certain DMRSs for a transmitter with multiple transmit antennas, the present invention also makes some improvements on an existing channel estimation method of a receiver. FIG. 6 illustrates a channel estimation method in accordance with an embodiment of the present invention.

Step 601: performing a serial-to-parallel (S/P) conversion to the received DMRS.

Step 602: converting the signal from time domain to frequency domain by performing a $N_{FFT}$-point Fast Fourier Transform (FFT), wherein $N_{FFT}$ is the number of FFT points.

Step 603: distinguishing DMRSs of different groups of transmit antennas by a frequency division multiplexing (FDM) manner in the frequency domain according to the allocation of resource blocks of different users. Here, the transmit antennas in a same group occupy the same time-frequency resources.

In view of an MU-MIMO transmission system, since each UE uses one transmit antenna, transmit antennas within different groups correspond to UEs within different groups.

In a simple system, there may be only one group of transmit antennas. In other words, all the time-frequency resources are shared by that group of transmit antennas. For example, there is only one user with multiple transmit antennas in the system, thus all the time-frequency resources are shared by the multiple transmit antennas of the user. In this case, there is no need to perform step 603.

Step 604: setting a base transmit antenna for each group of transmit antennas, calculating the complex conjugate of the DMRS of the base transmit antenna for each group, and multiplying the DMRSs of each group of transmit antennas distinguished from other groups by the complex conjugate corresponding to that group.

Here, in view of MU-MIMO, the antenna that the first user uses is taken as the base transmit antenna; and in view of SU-MIMO, the first transmit antenna is taken as the base transmit antenna.

Step 605: performing a frequency-domain windowing operation.

In actual simulations, a Blackman window can be chosen as the frequency-domain window function, and other types of window functions are also applicable. In order to avoid useful channel information being set to 0, the frequency-domain window length should be larger than the bandwidth occupied by the user.

Step 606: converting the signal from frequency domain to time domain by performing a $N_{FFT}$-point Inverse Fast Fourier Transform (IFFT).

Step 607: setting a channel impulse response (CIR) region for each time-domain signal.

Specifically, the method of Dynamic CIR Reservation ($DCIR^2$) can be adopted to set the channel impulse response (CIR) region. It can be seen that, since the time-domain signal is discrete, sample points of the CIR are reserved in this step for calculating the channel frequency response (CFR) in subsequent steps.

Existing channel estimation algorithms on a receiver are usually based on Discrete Fourier Transform (DFT). CIR samples within the range of a cyclic prefix (CP) are reserved in time domain (for example, referring to 3GPP, R1-062642 proposal) to achieve the object of saving useful signals and suppressing noises and interferences. However, the existing algorithms neglect the problem that in the uplink of an actual system, the allocation of RBs may result in CIR energy leakage in the channel estimation process. Therefore, the performance of the existing algorithms would be greatly decreased especially when the number of RBs allocated to the UE is small.

In view of the above, while reserving CIR samples in accordance with an embodiment of the present invention, the CIR samples are divided into two parts taking $$\left(\frac{C}{n_T} \cdot i\right) \cdot N_{FFT}, i = 0, 1, \ldots, n_T - 1$$

as a central point.

the right part: having a border point $$\left(\frac{C}{n_T} \cdot i\right) \cdot N_{FFT} + \lambda \cdot CP - 1, i = 0, 1, \ldots, n_T - 1;$$

the number of sample points reserved is $\lambda \cdot CP$, wherein CP is the length of the cyclic prefix of the SC-FDMA symbol, and $\lambda$ is a variable parameter ($0 < \lambda \leq 1$) whose specific value can be optimized in actual systems.

the left part: having a border point $$\left[\left(\frac{C}{n_T} \cdot i\right) \cdot N_{FFT} - \mu \cdot \Delta + N_{FFT}\right] \mod(N_{FFT}), i = 0, 1, \ldots, n_T - 1;$$

the number of sample points reserved is $\mu \cdot \Delta$, wherein $\Delta$ is the main lobe width of the CIR energy leakage and $$\Delta = \frac{N_{FFT}}{12 \cdot RB\#},$$

$\mu$ is a variable parameter $$\left(0 \leq \mu < \frac{N_{FFT}/n_T - CP}{\Delta}\right)$$

whose specific value can be optimized in actual systems. To simplify the implementation, it can be defined that $$\Delta' = \frac{N_{FFT}}{12} \text{ and } \mu' = \frac{\mu}{RB\#},$$

thus only one variable $\mu'$ is left in the left part.

In view of $\lambda$ and $\mu'$, the former depends mainly on noises and multi-path delays, while the latter depends mainly on noises and RB#. It is found by experiments that actual systems are not so sensitive to the changing of $\lambda$ and $\mu'$. In other words, slight differences in the values of these two variables have little influence on channel estimation and link performance as long as the values are in a certain range.

In specific realizations, only $\lambda \cdot CP$ sample points in the right part are reserved (i.e. $\mu=0$). Or, the number of sample points in the right part is fixed on CP (i.e. $\lambda=1$), and only the number of sample points in the left part is adjusted.

Step 608: distinguishing the CIRs of different transmit antennas in the group according to different cyclic shift values of DMRSs of the transmit antennas, and shifting the central point of the CIR of the corresponding transmit antenna according to formula $$\left(\frac{C}{n_T} \cdot i\right) \cdot N_{FFT}, i = 0, 1, \ldots, n_T - 1.$$

In view of MU-MIMO, the CIRs of different UEs can be distinguished according to the cyclic shift values of DMRSs of transmit antennas of different UEs. In view of SU-MIMO, the CIRs of different transmit antennas can be distinguished according to the cyclic shift values of DMRSs of different transmit antennas.

Step 609: converting the reserved CIR of each transmit antenna from time domain to frequency domain by a $N_{FFT}$-point FFT.

Step 610: performing a frequency-domain dewindowing operation.

Thus, the channel estimation process is complete.

It should be noted that steps 602-610 make up of the main process of channel estimation. Among them, it is also possible not to perform the frequency-domain windowing and dewindowing operations described in steps 605 and 610, without affecting the integrity of channel estimation. This channel estimation method is applicable in the uplink of LTE and LTE-A systems. Of course, this channel estimation method is applicable in other systems based on OFDMA or SC-FDMA adopting a frequency-domain block (phase shift) reference signal.

In addition, this channel estimation method can be used along with the DMRS method illustrated in FIG. 1, or can also be used independently. Here, the channel estimation method is used at the side of a base station, while the DMRS method is used at the side of a user.

Figure 7:
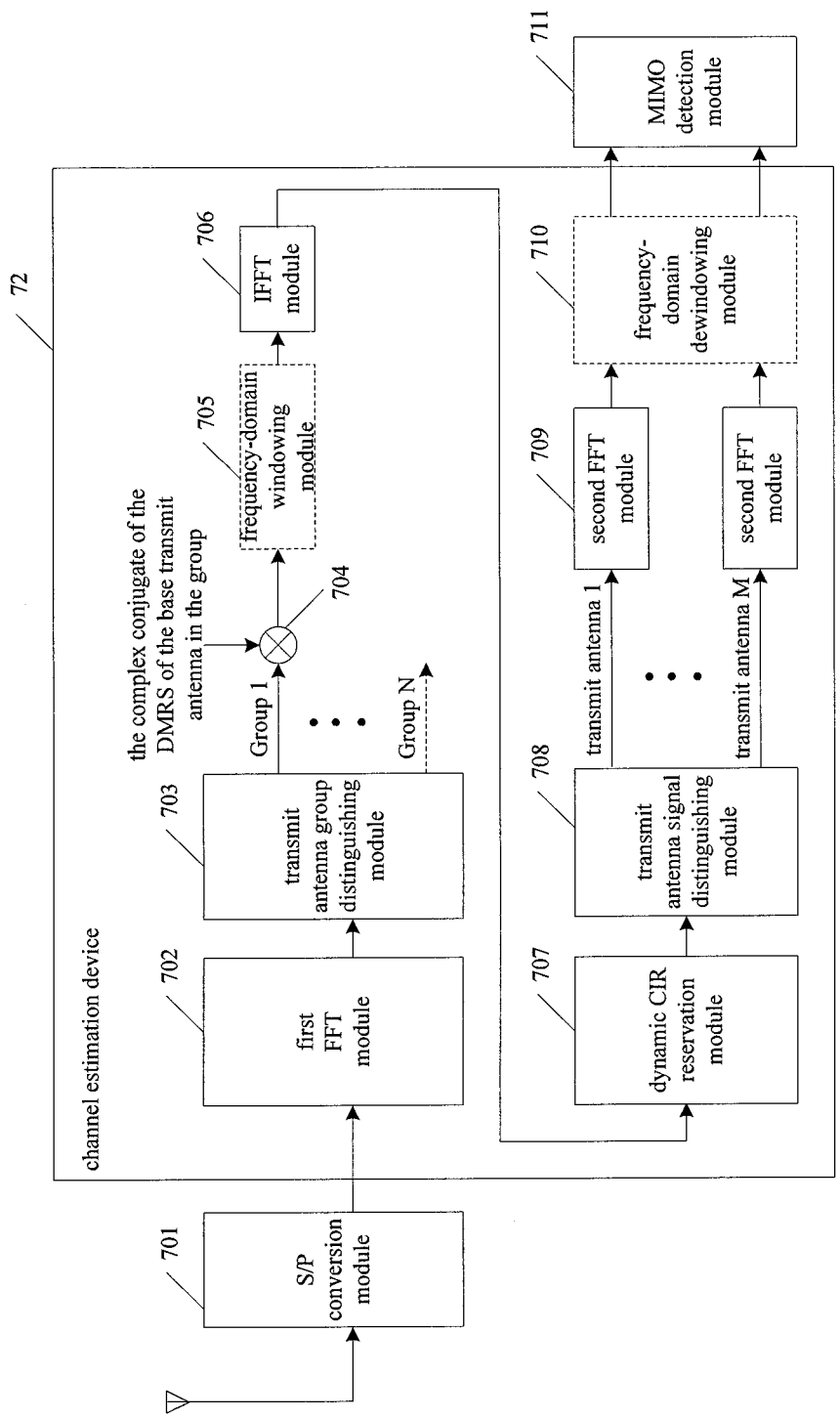
FIG. 7 is a schematic diagram illustrating the structure of a channel estimation device located in a base station in accordance with an embodiment of the present invention.

Accordingly, FIG. 7 is a diagram illustrating the structure of a channel estimation device located in the base station in accordance with an embodiment of the present invention. The channel estimation device 72 includes: a first FFT module 702 connecting to a serial-to-parallel (S/P) conversion module 701, a transmit antenna group distinguishing module 703, a multiplier 704, an IFFT module 706, a dynamic CIR reservation module 707, a transmit antenna signal distinguishing module 708 and a second FFT module 709 connecting to an MIMO detection module 711. Among them, each of the modules implements one corresponding step illustrated in FIG. 6. For example, the first FFT module 702 is adapted to implement step 602. In real applications, the base station can set a channel estimation device 72 as illustrated in FIG. 7 for each receiving antenna.

In the channel estimation device 72, the transmit antenna group distinguishing module 703 is adapted to distinguish signals of different groups of transmit antennas. For example, in this embodiment, the transmit antennas are divided into a total number of N groups, and the transmit antenna group distinguishing module 703 will distinguish these groups as Group 1, ..., Group N.

A multiplier 704 is set for the received signals corresponding to each transmit antenna group, and is adapted to multiply the complex conjugate of the DMRS of the base transmit antenna in the group by the DMRS receiving signals of this transmit antenna group. The complex conjugate of the DMRS of the base transmit antenna is stored or calculated in the base station in advance.

The dynamic CIR reservation module 707 is adapted to set a channel impulse response region, determine sample points of the channel impulse response and obtain the corresponding sample values, in order to calculate a channel frequency response in subsequent steps. In real applications, the dynamic CIR reservation module 707 first determines the central point $$\left(\frac{C}{n_T} \cdot i\right) \cdot N_{FFT}, i = 0, 1, \ldots, n_T - 1$$

of the sample points. Then, the dynamic CIR reservation module 707 selects λ·CP sample points on the right part of the central point. That is, sample points between $$\left(\frac{C}{n_T} \cdot i\right) \cdot N_{FFT}, i = 0, 1, \ldots, n_T - 1$$

and $$\left(\frac{C}{n_T} \cdot i\right) \cdot N_{FFT} + \lambda \cdot CP - 1, i = 0, 1, \ldots, n_T - 1$$

will be selected. Or, sample points between $$\left[\left(\frac{C}{n_T} \cdot i\right) \cdot N_{FFT} - \mu \cdot \Delta + N_{FFT}\right] \mod(N_{FFT}), i = 0, 1, \ldots, n_T - 1$$

and $$\left(\frac{C}{n_T} \cdot i\right) \cdot N_{FFT} + \lambda \cdot CP - 1, i = 0, 1, \ldots, n_T - 1$$

will be selected. That is, the start point of the sample points is determined to be $$\left[\left(\frac{C}{n_T} \cdot i\right) \cdot N_{FFT} - \mu \cdot \Delta + N_{FFT}\right] \mod(N_{FFT}), i = 0, 1, \ldots, n_T - 1.$$

In this case, there will be μ·Δ sample points on the left part of the central point $$\left(\frac{C}{n_T} \cdot i\right) \cdot N_{FFT}, i = 0, 1, \ldots, n_T - 1.$$

The transmit antenna signal distinguishing module 708 is adapted to distinguish signals of different transmit antennas in each group and extract channel impulse responses corresponding to the transmit antennas respectively. For example, in this embodiment, Group 1 totally has M transmit antennas. The signals of Group 1, after being processed by the transmit antenna signal distinguishing module 708 wherein the processing includes signal distinguishing and extracting according to different cyclic shift values, are divided into M signals. Each of the M signals corresponds to a transmit antenna.

In addition, the channel estimation device 72 may also include: a frequency-domain windowing module 705 and a frequency-domain dewindowing module 710. Here, the frequency-domain windowing module 705 connects to the multiplier 704 and the IFFT module 706 respectively; while the frequency-domain dewindowing module 710 connects to the second FFT module 709 and the MIMO detection module 711 respectively.

It should be noted that the base station will set a processing unit for the received signals corresponding to each group of transmit antennas. The processing unit includes the multiplier 704, the IFFT module 706, the dynamic CIR reservation module 707, the transmit antenna signal distinguishing module 708 and the second FFT module 709. The processing unit may further include the frequency-domain windowing module 705 and the frequency-domain dewindowing module 710. For example, different processing units are set for the signals of Group 1 and Group N (see FIG. 7) respectively. Here, only the processing unit corresponding to the signals of Group 1 is illustrated, while the processing unit corresponding to the signals of Group N is not illustrated in FIG. 7. However, it can be understood that the processing unit corresponding to the signals of Group N is similar to the processing unit corresponding to the signals of Group 1.

Since designing the DMRSs is for channel estimation after all, the performance of the DMRSs determined via the method illustrated in FIG. 1 can be valued using the channel estimation method illustrated in FIG. 6, wherein the channel estimation is performed in accordance with the simulation parameters in Table 1.

TABLE 1

| | |
|---|---|
| Carrier frequency | 2 GHz |
| Bandwidth | 10 MHz |
| FFT size | 1024 |
| Usable subcarrier number | 600 |
| Cyclic prefix | 72 |
| RB number | 1, 5, 10 |
| MIMO configuration (one codeword, spatial multiplexing) | 2 * 2, 4 * 4 |
| Modulation | 16QAM |
| Channel coding | Turbo, ½, Interleaver 288 bits |
| MIMO detection | MMSE |
| Frequency hopping | Disabled |
| Multiple cyclic shift value selection | Random (without collision) Maximum Distance Binding (MDB) |
| Uplink channel estimation algorism within a slot | Conventional channel estimation with CPR Improved channel estimation with dynamic CIR Reservation ($DCIR^2$) |
| Inter-slot interpolation | Linear interpolation |
| Channel model | 3GPP TR 25.996 Case 2 |
| Mobile speed | 3 km/h |

Figure 8A:
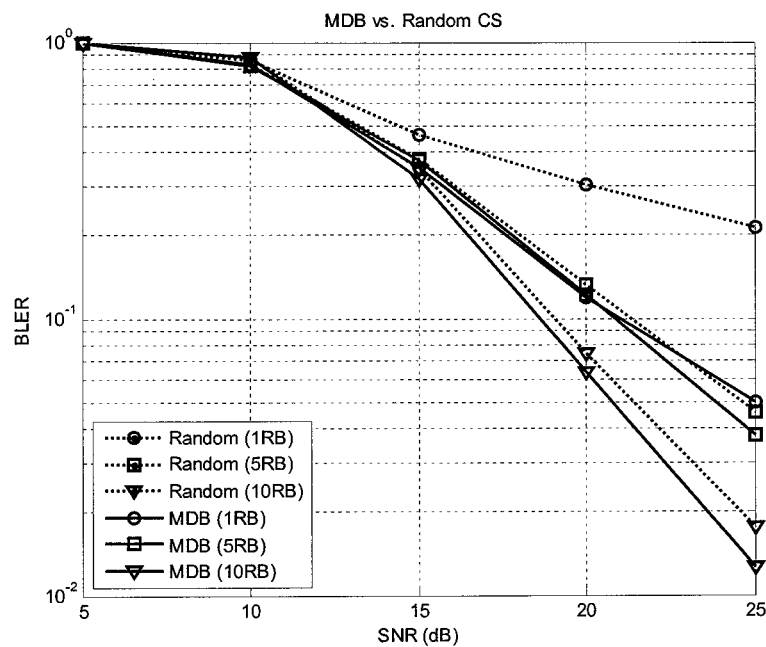
FIGS. 8(a) and (b) are schematic diagrams illustrating simulation performances of the method for providing demodulation reference signals shown in FIG. 1.

Here, FIG. 8(a) is a diagram illustrating comparison of the two block error rates (BLER) when cyclic shift values of DMRSs are determined by a MDB manner and by a random manner, wherein the MIMO configuration is 2*2. In FIG. 8(a), in view of the MDB manner, there are three performance curves correspond to different number of RBs (RB#), while in view of the random manner, there are also three performance curves correspond to different number of RBs (RB#). Here, the random manner refers to that the cyclic shift value of a DMRS can have any possible value, and different transmit antennas have different cyclic shift values. It can be seen that the BLER of the MDB manner is smaller than the BLER of the random manner. Especially, when RB# is small (for example, RB#=1), the advantage of performance of the MDB manner is more obvious.

Figure 8B:
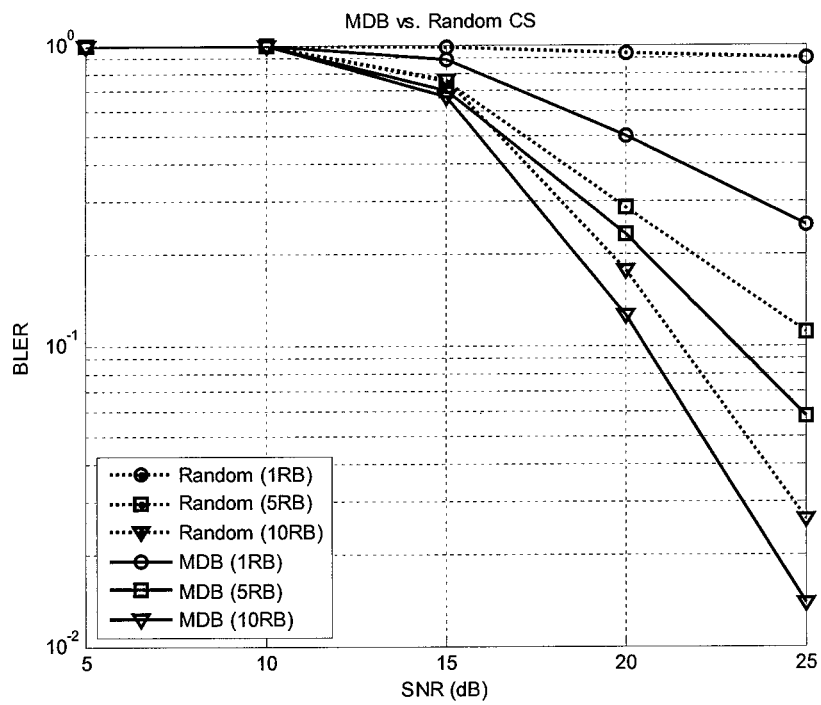

FIG. 8(b) illustrates a simulation result when the MIMO configuration is 4*4. It can also be seen that the performance of the MDB manner is better than that of the random manner.

It should be noted that in FIGS. 8(a) and (b), the channel estimation algorithms of the receiver both adopt $DCIR^2$ method without frequency-domain windowing. Obviously, the smaller the RB# is, the greater the performance gain of the MDB manner is.

Figure 9A:
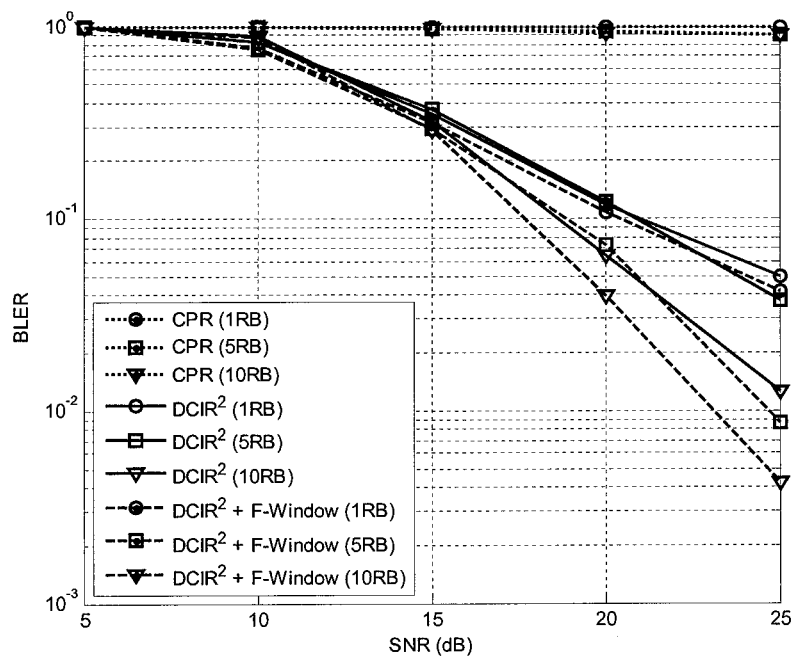
FIGS. 9(a) and (b) are schematic diagrams illustrating simulation performances of the channel estimation method shown in FIG. 6.
Figure 9B:
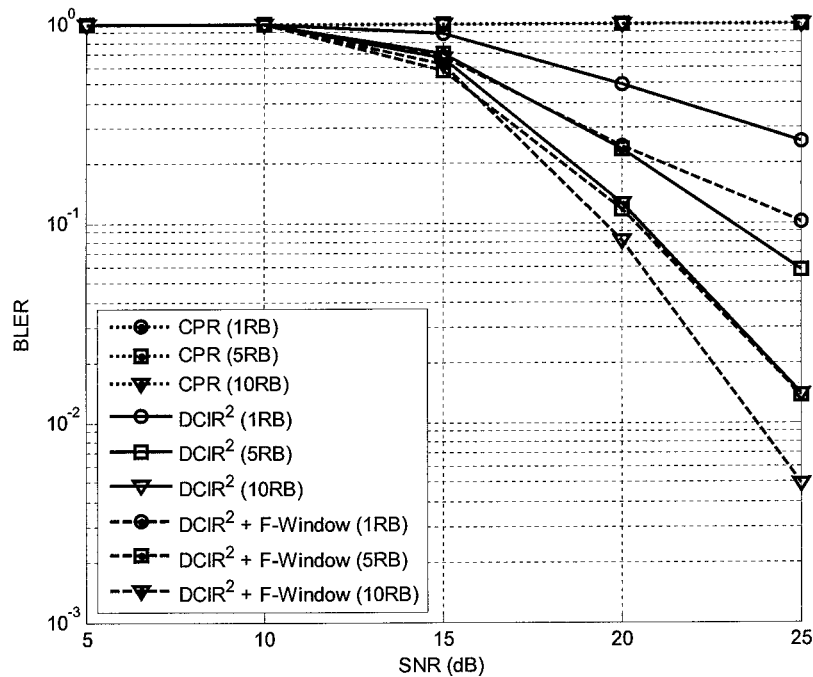

In FIGS. 9(a) and (b), the BLER performances in a 2*2 system and a 4*4 system adopting different channel estimation methods are compared. Here, the selection of the cyclic shift values of the DMRSs of the transmitters follows the MDB manner. Compared with traditional channel estimation method that reserves a cyclic prefix (CPR), $DCIR^2$ can significantly improve the link performance. While combined with the frequency-domain windowing operation and the frequency-domain dewindowing operation, the performance of $DCIR^2$ is further improved (a relevant cost is the increasing of complexity). And the smaller the RB# is, the more obvious the improvement of the performance is. In the simulations of the present invention, the Blackman window is chosen as the frequency-domain window function. Since the bandwidth occupied by a user is RB#*12, the window length is set as 1.1*RB#*12.

It should be noted that the values of λ and µ' are merely required to be within a certain range, and a slight difference in the value of any of these two variables has little influence on channel estimation and link performance. As a result, in the simulations of the present invention, the values of λ and µ' are simply divided into two cases according to RB#: when RB#=1, 2, the value of λ is 1 and the value of µ' is 0.6; when RB#>2, the value of λ is 0.5 and the value of µ' is 0.2. Of course, in different channel conditions and with different system parameters, the values of λ and µ' will change, and better performance can accordingly be obtained by optimizing the values of λ and µ' in accordance with different RB#.

It can be seen from the above embodiments that, the method, device and system provided by the present invention can select different cyclic shift values for DMRSs of different transmit antennas at the same time, and these cyclic shift values meet certain DMRS subordinating relationships. The DMRS of each transmit antenna can select different cyclic shift values at different times. And then, the reference signals of multiple transmit antennas are generated according to the base sequence and the determined cyclic shift values of the DMRSs, thus providing the DMRSs of the multiple transmit antennas with a better performance.

The invention claimed is:

1. A method for determining demodulation reference signal (DMRS) in the uplink, comprising:
    taking one of multiple transmit antennas in the uplink as a base transmit antenna, taking other transmit antennas as subordinating transmit antennas and setting a DMRS for the base transmit antenna;
    establishing DMRS subordinating relationships between the base transmit antenna and each of the subordinating transmit antennas, and setting a DMRS for each of the subordinating transmit antennas according to the DMRS of the base transmit antenna and the corresponding DMRS subordinating relationship;
    wherein setting a DMRS for the base transmit antenna comprises selecting a base sequence for the DMRS of the base transmit antenna, obtaining a reference signal of the base transmit antenna by performing a cyclic shift to the base sequence, and taking the reference signal as the DMRS of the base transmit antenna;
    wherein establishing DMRS subordinating relationships between the base transmit antenna and each of the subordinating transmit antennas comprises determining a cyclic shift value for the DMRS of the $i_{th}$ subordinating transmit antenna in accordance with formula $\alpha_i = 2\pi n_{cs,i}/C$ and formula $$n_{cs,i} = \left(n_{cs,0} + \frac{C}{n_T} \cdot i\right) \bmod(C),$$

wherein i=1, ..., $n_T$–1, C is a constant, $n_T$ is the number of the transmit antennas $\alpha_0$ is the cyclic shift value of the DMRS of the base, transmit antenna.

2. The method according to claim 1, wherein setting a DMRS for the base transmit antenna comprises:

calculating the reference signal of the base transmit antenna in accordance with formula $r_{u,v}^{(\alpha)}(n)=e^{j\alpha n}\bar{r}_{u,v}(n)$, $0 \leq n < M_{sc}^{RS}$;
wherein $\bar{r}_{u,v}(n)$ refers to the base sequence, $\alpha$ refers to a cyclic shift value of the base sequence, and $M_{sc}^{RS}$ refers to the length of the base sequence.

3. The method according to claim 1, wherein setting a DMRS for each of the subordinating transmit antennas according to the DMRS of the base transmit antenna and the corresponding DMRS subordinating relationship comprises:
calculating a reference signal for each of the subordinating transmit antennas according to the determined cyclic shift value of the DMRS of each of the subordinating transmit antennas and the base sequence of the DMRS of the base transmit antenna.

4. The method according to claim 1, further comprising:
the base station receiving the DMRSs sent by the multiple transmit antennas, performing Fast Fourier Transform to the received DMRSs and converting them from time domain to frequency domain, and multiplying the frequency-domain DMRSs by the complex conjugation of the DMRS of the base transmit antenna previously stored or calculated in the base station;
the base station performing Inverse Fast Fourier Transform to the DMRSs multiplied by the complex conjugation and converting them from the frequency domain to the time domain, and setting multiple channel impulse response regions for the DMRSs in the time domain;
the base station distinguishing multiple channel impulse responses corresponding to different transmit antennas within the channel impulse response regions according to the cyclic shift value of the DMRS of each of the transmit antennas, extracting the distinguished channel impulse responses respectively, and performing Fast Fourier Transform to the extracted channel impulse response corresponding to each transmit antenna and converting it from the time domain to the frequency domain.

5. The method according to claim 4, further comprising:
performing a frequency-domain windowing operation before performing the Inverse Fast Fourier Transform;
performing a frequency-domain dewindowing operation after performing the Fast Fourier Transform to the extracted channel impulse response corresponding to each transmit antenna.

6. The method according to claim 4, wherein setting a channel impulse response region for the DMRSs in the time domain comprises:
taking $$\left(\frac{C}{n_T} \cdot i\right) \cdot N_{FFT}, i = 0, 1, \ldots, n_T - 1$$

as a central point, and selecting $\mu \cdot \Delta$ samples on the left of the central point from the channel impulse response;
wherein $\Delta$ is the main lobe width of the energy leakage of the channel impulse response and $$\Delta = \frac{N_{FFT}}{12 \cdot RB\#}, N_{FFT}$$

is the number of samples of the Fast Fourier Transform, RB# is the number of recourse blocks, the value range of $\mu$ is $$0 \leq \mu < \frac{N_{FFT}/n_T - CP}{\Delta},$$

and CP is the length of the cyclic prefix of an SC-FDMA symbol, and the value range of C is a constant, $n_T$ is the number of the transmit antennas.

7. The method according to claim 4, wherein setting a channel impulse response region of the DMRSs in the time domain comprises:
taking $$\left(\frac{C}{n_T} \cdot i\right) \cdot N_{FFT}, i = 0, 1, \ldots, n_T - 1$$

as a central point, and selecting $\mu \cdot CP$ samples on the right of the central point from the channel impulse response, wherein CP is the length of the cyclic prefix of an SC-FDMA symbol, and the value range of $\lambda$ is $0 < \lambda \leq 1$, C is a constant, $n_T$ is the number of the transmit antennas.

8. A method for determining demodulation reference signal (DMRS) in the uplink, comprising:
taking one of multiple transmit antennas in the uplink as a base transmit antenna, taking other transmit antennas as subordinating transmit antennas and setting a DMRS for the base transmit antenna;
establishing DMRS subordinating relationships between the base transmit antenna and each of the subordinating transmit antennas, and setting a DMRS for each of the subordinating transmit antennas according to the DMRS of the base transmit antenna and the corresponding DMRS subordinating relationship;
wherein setting a DMRS for the base transmit antenna comprises selecting a base sequence for the DMRS of the base transmit antenna, obtaining a reference signal of the base transmit antenna by performing a cyclic shift to the base sequence, and taking the reference signal as the DMRS of the base transmit antenna;
wherein establishing DMRS subordinating relationships between the base transmit antenna and each of the subordinating transmit antennas comprises:
determining an uplink scheduling component of the cyclic shift value of the DMRS of the $i_{th}$ subordinating transmit antenna in accordance with formula $$n_{DMRS,i}^{(2)} = \left(n_{DMRS,0}^{(2)} + \frac{C}{n_T} \cdot i\right) \bmod(C);$$

wherein $i=1, \ldots, n_T-1$, C is a constant $n_T$ is the number of the transmit antennas.

9. The method according to claim 8, wherein setting a DMRS for each of the subordinating transmit antennas according to the DMRS of the base transmit antenna and the corresponding DMRS subordinating relationship comprises:
sending, by a base station, an uplink scheduling command to each user equipment (UE) corresponding to each of the subordinating transmit antennas, the uplink scheduling command comprising the uplink scheduling component of the cyclic shift value of the DMRS;
each UE calculating the cyclic shift value of its DMRS according to the uplink scheduling component after receiving the uplink scheduling command, and calculating the reference signal of the corresponding subordinating transmit antenna according to the base sequence of the base transmit antenna and the calculated cyclic shift value.

10. A user equipment (UE), wherein the UE has multiple transmit antennas and a multiplier is set for each transmit antenna;
the UE further comprises: a base sequence selection module and a demodulation reference signal (DMRS) subordination module;
the base sequence selection module is adapted to determine a base sequence for DMRSs of the multiple transmit antennas;
the DMRS subordination module is adapted to take one of the multiple transmit antennas as a base transmit antenna and take other transmit antennas as subordinating transmit antennas, establish subordinating relationships between a cyclic shift value of the DMRS of the base transmit antenna and that of each of the subordinating transmit antennas; and determine the cyclic shift value of the DMRS of each subordinating transmit antenna according to the cyclic shift value of the DMRS of the base transmit antenna;
the multiplier set for each transmit antenna is adapted to multiply the cyclic shift value of the corresponding transmit antenna and the base sequence to obtain the DMRS of the corresponding transmit antenna;
wherein the DMRS subordination module is adapted to calculate the cyclic shift value of the DMRS of the $i_{th}$ subordinating transmit antenna according to formula $\alpha_i = 2\pi n_{cs,i}/C$ and formula $$n_{cs,i} = \left(n_{cs,0} + \frac{C}{n_T} \cdot i\right) \bmod(C),$$

wherein $i=1, \ldots, n_T-1$, C is a constant, $n_T$ denotes the number of the transmit antennas, $\alpha_0$ denotes the cyclic shift value of the DMRS of the base transmit antenna.

11. An uplink communication system, comprising: a base station and multiple user equipments (UE), each of the UEs having one transmit antenna;
the base station is adapted to take one of the multiple transmit antennas of the multiple UEs as a base transmit antenna, take other transmit antennas as subordinating transmit antennas, and inform each UE of an uplink scheduling component of the cyclic shift value of corresponding demodulation reference signal (DMRS) through an uplink scheduling command, wherein DMRS subordinating relationships are established between the uplink scheduling component of the base transmit antenna and that of each of the subordinating transmit antennas;
each UE is adapted to calculate the DMRS according to the uplink scheduling component of the cyclic shift value informed by the base station and a base sequence of the DMRS of the base transmit antenna;
wherein the base station is adapted to determine the uplink scheduling component of the cyclic shift value of the DMRS of the transmit antenna according to formula $$n_{DMRS,i}^{(2)} = \left(n_{DMRS,0}^{(2)} + \frac{C}{n_T} \cdot i\right) \bmod(C),$$

and notify the corresponding UE of the uplink scheduling component of the cyclic shift value of the DMRS of the corresponding transmit antenna through the uplink scheduling command, wherein $i=0, 1, \ldots, n_T-1$, C is a constant, $n_T$ denotes the number of the transmit antennas, $n_{DMRS,0}^{(2)}$ denotes the uplink scheduling component of the cyclic shift value of the DMRS of the base transmit antenna.

12. A method for determining demodulation reference signal (DMRS) in the uplink, comprising:
taking one of multiple first data streams as a base data stream, taking other first data streams as subordinating data streams and setting a DMRS for the base data stream;
establishing DMRS subordinating relationships between the base data stream and each of the subordinating data streams, and setting a DMRS for each of the subordinating data streams according to the DMRS of the base data stream and the corresponding DMRS subordinating relationship; and
precoding each first data stream together with the DMRS set for the first data stream to form one or more second data streams, each of the second data streams being sent out from one transmit antenna in the uplink;
wherein establishing DMRS subordinating relationships between the base data stream and each of the subordinating data streams comprises determining a cyclic shift value for the DMRS of the $i_{th}$ subordinating data stream in accordance with formula a, $\alpha_i = 2\pi n_{cs,i}/C$ and formula $$n_{cs,i} = \left(n_{cs,0} + \frac{C}{n_T} \cdot i\right) \bmod(C),$$

wherein $i=1, \ldots, n_T-1$, C is a constant, $n_T$ is the number of the first data streams, $\alpha_0$ is the cyclic shift value of the DMRS of the base data stream.

13. The method according to claim 12, wherein setting a DMRS for the base data stream comprises:
calculating the reference signal of the base data stream in accordance with formula $r_{u,v}^{(\alpha)}(n) = e^{j\alpha n} \bar{r}_{u,v}(n)$, $0 \leq n < M_{sc}^{RS}$;
wherein $\bar{r}_{u,v}(n)$ refers to a base sequence, $\alpha$ refers to a cyclic shift value of the base sequence, and $M_{sc}^{RS}$ refers to the length of the base sequence.

14. A method for determining demodulation reference signal (DMRS) in the uplink, comprising:
taking one of multiple first data streams as a base data stream, taking other first data streams as subordinating data streams and setting a DMRS for the base data stream;
establishing DMRS subordinating relationships between the base data stream and each of the subordinating data streams, and setting a DMRS for each of the subordinating data streams according to the DMRS of the base data stream and the corresponding DMRS subordinating relationship; and
precoding each first data stream together with the DMRS set for the first data stream to form one or more second data streams, each of the second data streams being sent out from one transmit antenna in the uplink;
wherein establishing DMRS subordinating relationships between the base data stream and each of the subordinating data streams comprises:

determining an uplink scheduling component of the cyclic shift value of the DMRS of the $i_{th}$, subordinating data stream in accordance with formula $$n_{DMRS,i}^{(2)} = \left(n_{DMRS,0}^{(2)} + \frac{C}{n_T} \cdot i\right) \mod(C);$$

wherein $i=1, \ldots, n_T-1$, C is a constant, $n_T$ is the number of the first data streams.

* * * * *